(12) United States Patent
Havimäki

(10) Patent No.: US 9,297,690 B2
(45) Date of Patent: Mar. 29, 2016

(54) METHOD IN THE CHECK WEIGHING OF A WEIGHING SYSTEM AND SOFTWARE PRODUCT AND ARRANGEMENT IN THE CHECK WEIGHING OF A WEIGHING SYSTEM AND MATERIALS HANDLING EQUIPMENT

(75) Inventor: Esko Havimäki, Mieto (FI)

(73) Assignee: Ponsse Oyj (FI)

( * ) Notice: Subject to any disclaimer, the term of this patent is extended or adjusted under 35 U.S.C. 154(b) by 257 days.

(21) Appl. No.: 13/978,935

(22) PCT Filed: Jan. 24, 2012

(86) PCT No.: PCT/FI2012/050058
§ 371 (c)(1),
(2), (4) Date: Jul. 10, 2013

(87) PCT Pub. No.: WO2012/101325
PCT Pub. Date: Aug. 2, 2012

(65) Prior Publication Data
US 2013/0292190 A1 Nov. 7, 2013

(30) Foreign Application Priority Data

Jan. 28, 2011 (FI) .................................. 20115087
May 18, 2011 (FI) .................................. 20115480

(51) Int. Cl.
*G01G 23/01* (2006.01)
*A01G 23/00* (2006.01)
(Continued)

(52) U.S. Cl.
CPC ................ *G01G 23/01* (2013.01); *A01G 23/00* (2013.01); *B66C 1/585* (2013.01); *B66C 23/905* (2013.01); *G01G 19/083* (2013.01); *G01G 19/14* (2013.01)

(58) Field of Classification Search
CPC ...... G01G 19/08; G01G 19/083; G01G 19/10; G01G 19/12; G01G 19/14; G01G 23/01; B60G 2200/60; B60G 2200/64; B60G 2204/11; B66C 1/585; B66C 23/905; A01G 23/00
See application file for complete search history.

(56) References Cited

U.S. PATENT DOCUMENTS 4,063,649 A * 12/1977 Hubbard et al. ............... 212/278
4,486,136 A * 12/1984 Howard .......................... 414/21
(Continued)

FOREIGN PATENT DOCUMENTS

GB 1495277 12/1977
GB 2463915 3/2010
(Continued)

OTHER PUBLICATIONS

International Searching Authority (PCT/ISA), International Search Report for PCT/FI2012/050058, Mailing Date May 14, 2012, 4 pages.

*Primary Examiner* — Peter Macchiarolo
*Assistant Examiner* — Natalie Huls
(74) *Attorney, Agent, or Firm* — Beem Patent Law Firm

(57) ABSTRACT

The invention relates to a method in the check weighing of a weighing system. In the method, a hoist (15) equipped with a weighing system (14) is used to lift a load (27), which is weighed, and the value measured by the weighing system (14) is recorded. In the method, the weighing system (14) is adjusted as required, on the basis of the recorded values. A real load (28), which is weighed when not moving, is used as the load (27). The same real load (28) is also weighed during a normal movement while moving. A reference value is defined from these two weighings of the same real load (28), on the basis of which the weighing system (14) is adjusted if necessary and/or the precision probably achieved by the weighing system (14) is estimated. The invention also relates to a software product and an arrangement in the check weighing of a weighing system, and materials handling equipment.

18 Claims, 5 Drawing Sheets

(51) Int. Cl.
  *B66C 1/58* (2006.01)
  *B66C 23/90* (2006.01)
  *G01G 19/08* (2006.01)
  *G01G 19/14* (2006.01)

(56) References Cited

U.S. PATENT DOCUMENTS

| | | | | |
|---|---|---|---|---|
| 4,658,921 | A | * | 4/1987 | Karpa .............................. 177/50 |
| 5,245,137 | A | * | 9/1993 | Bowman et al. .............. 177/139 |
| 5,509,293 | A | * | 4/1996 | Karumanchi .................. 73/1.13 |
| 5,837,945 | A | * | 11/1998 | Cornwell et al. ............ 177/136 |
| 5,917,159 | A | * | 6/1999 | Kostiuk ........................ 177/136 |
| 6,072,127 | A | * | 6/2000 | Oslakovic .................... 177/136 |
| 7,514,639 | B2 | * | 4/2009 | Heuer ........................... 177/147 |
| 8,660,758 | B2 | * | 2/2014 | Janardhan et al. .............. 701/50 |
| 2004/0133384 | A1 | * | 7/2004 | Allerding et al. ............. 702/173 |
| 2008/0319710 | A1 | * | 12/2008 | Hsu et al. ..................... 702/174 |
| 2009/0127031 | A1 | * | 5/2009 | Corder et al. ................. 187/393 |
| 2014/0231153 | A1 | * | 8/2014 | Fukasu et al. ............. 177/25.13 |

FOREIGN PATENT DOCUMENTS

| | | |
|---|---|---|
| WO | 9409347 | 4/1994 |
| WO | 2009007492 | 1/2009 |

* cited by examiner

US 9,297,690 B2

METHOD IN THE CHECK WEIGHING OF A WEIGHING SYSTEM AND SOFTWARE PRODUCT AND ARRANGEMENT IN THE CHECK WEIGHING OF A WEIGHING SYSTEM AND MATERIALS HANDLING EQUIPMENT

CROSS-REFERENCE TO RELATED APPLICATIONS

This application is a U.S. national stage application of PCT application PCT/FI2012/050058, filed Jan. 24, 2012, and claims the benefit of priority from Finnish patent applications 20115087, filed Jan. 28, 2011, and 20115480 filed May 18, 2011.

BACKGROUND OF THE INVENTION

The present invention relates to a method in the check weighing of a weighing system, in which method a hoist equipped with a weighing system is used to lift a load, which is weighed, and the value measured by the weighing system is recorded, and, in the method, the weighing system is adjusted as required, on the basis of the recorded values. The invention also relates to a software product and an arrangement in the check weighing of a weighing system, and to materials-handling equipment.

According to the prior art, in forestry and particularly in timber harvesting and timber trading, volume measurement has become an established form of measurement. This can indeed be done reliably, even automatically, for example using harvesters that are as such known and the measuring devices used in them. In addition, especially earlier, volume measurement has been performed, for example, at timber-processing plants, by, among other means, immersion, as well as by means of so-called circumference measurement or various measurement portals, such as a system based on laser measurement. However, particularly in terms of functioning logistics, it would be advantageous to have the measurement performed at the earliest possible stage in the timber-sourcing chain, such as most advantageously immediately in connection with the timber harvesting, or the local transportation of timber. Particularly during the harvesting of energy wood, which has become widespread in recent years, it is difficult to arrange reliable and functioning volume measurement in connection with a chipper that harvests the said timber grade or with some other harvester, because the timber material or timber grade being harvested is often of a small dimension and has a trunk shape that makes it practically impossible to accurately measure the diameter or length. In addition, in the case of energy wood, the form of harvesting generally used is so-called mass processing, instead of harvesting individual trees. This means principally that several trunks at a time are fed through the harvester head, possibly stripping them partially or totally, or alternatively completely without stripping them. For the aforementioned reasons among others, in forestry, particularly when trading in fibre and energy wood, and also in stumps harvested for energy use, a change has taken place to weighing the said timber grade already in the forest. In other words, a change has been made to using mass-based measurement instead of conventional volume-based measurement, because energy wood and other fractions collected from the forest have many different properties. For this purpose a special loader scale is fitted to the loader of a forwarder, by means of which each load lifted can be weighed. Typically, by summing the masses of the individual loads, the total mass of the forwarder's load can be determined and correspondingly by summing the masses of the loads the mass of the timber collected, by grade, from the entire harvesting area is calculated. Because generally the measurement performed using a loader scale in this way is the only weighing performed in the whole delivery chain, the weighing result must correspond with an acceptable accuracy to the real mass of the harvested and transported loads. The buyer and the seller can then be confident that the weighing will be correct. Part of the weighing system described above is a loader scale, which is fitted to the loader that acts as a hoist, especially in the case of a forwarder or timber truck. The hoist can be a crane, which is used to move any bulk or piece goods whatever, though the benefits of the solution according to the invention are emphasized in weighing systems, in which the particular characteristics of the material being weighed and of the actual loading process cause dispersion and imprecision in the weighing result.

Check weighing has been developed to evaluate and monitor the adjustment and operation of the loader scale and the weighing precision. Software, in which it is possible to program, for example, the acceptable accuracy, as well as other functions relating to the loader scale, is stored in the central unit belonging to the loader scale. A special test weight with a known mass is used in known check weighing, and is moved from the load space of the forwarder to a stack, according to normal working procedure, as is done normally with the loads handled in actual loading work. The moves are repeated and the value of each weighing is recorded. On the basis of the values given by check weighings made in this manner, the loader scale is adjusted so that the value measured/determined by the loader scale will correspond to the mass of the test weights used in the check weighing. The adjustment is preferably carried out by software, in such a way that the driver enters, or at least accepts the proposed correction, for example, through the central unit of the weighing system.

However, existing check weighing utilizing a special test weight with a known mass has certain drawbacks, particularly in a dynamic weighing situation. It has been shown in practical tests that, in certain cases, the real mass of the timber may deviate excessively from the mass obtained using loader scales. For example, by adjusting a loader scale to display precisely the mass of the test weight using a known check-weighing method, too great a mass may be obtained as the real result of the loader scale. There can be several reasons leading to this in the weighing system itself, in the material being weighed, or, for example, in the environmental conditions.

There is one significant difference between a test weight and real loads, particularly energy-wood loads. An energy-wood load, with a weight of an order of magnitude corresponding essentially to that of the test weight, has a length that is typically considerably longer than that of the test weight. Such a load can have a nearly arbitrary shape in its other dimensions, which can cause variations in a precise weighing performed in a dynamic weighing situation, in which the load is in a rotational and/or translational movement relative to one or more axes. At its longest, an energy-wood load can be as much as nearly ten-meters long, comprising entire energy trees, or at least long parts of their trunks. Generally, the goods grade, mass, and dimensions of the load affect the loading event, and thus the measurement result. Other influencing factors include the environment, the driver, and the machine, such as the forwarder. In other words, there can be several different reasons for a loader scale to show an erroneous load, compared to the real mass.

In addition, test weighing using a special test weight, along with its repeats, takes up an excessively large part of actual working time and is not productive. Therefore in practice test weighing may be performed only about once a week, which is not necessarily sufficient to ensure sufficiently good weighing precision. Conditions and the operation of the device may, however, change during a week, leading to an increased risk of a weighing error. Typically such a change can be, for example, a change in the electronics effecting the measurement of the shackle, or especially in the zero position or angular coefficient of the strain gauges, which may indicate a need to perform calibration or check weighing. Similarly, for example, over the course of a week or a day the timber grade and also the operator of the weighing system and loader may change, which can also increase the error. In addition, check weighing always demands a separate test weight, which must be carried along with the forwarder. The test weight may be lost, or damaged when being handled, or its other properties may change, despite it being built to be as stable and durable as possible for its purpose, which will in turn act to weaken the reliability of the check weighing.

SUMMARY OF THE INVENTION

The invention is intended to create a new type of method for the check weighing of a weighing system, by means of which the precision of a weighing system will be improved, more simply and more quickly than before. In addition, the invention is intended to create a new type of software product, by means of which the precision of a weighing system will be made better than before. Further, the invention is intended to create a new type of arrangement for the check weighing of a weighing system, which can be implemented by means of known components. The invention is also intended to create a new type of materials-handling machine, which can be used for efficient working, while retaining a high weighing precision and simultaneously effectively monitoring the weighing precision. The solution according to the invention permits continuous and graphic monitoring, to estimate the weighing precision at any time. The characteristic features of the method according to the invention are stated in the accompanying Claim 1 and the characteristic features of the software product according to the invention in the accompanying Claim 14. Correspondingly, the characteristic features of the arrangement according to the invention are stated in the accompanying Claim 16 and the characteristic features of the materials-handling machine in the accompanying Claim 18. According to the invention, the test weight can even be left completely unused, by replacing it with a real load. In addition, test weighing is performed in a new and surprising manner, in which any detrimental effect of the operator is minimized. In other words, the check weighing takes into account the personal working habits of each operator. At the same time, check weighing is part of normal working, so that the work performance of a forwarder or other materials-handling hoist or loader, using a loader scale will remain essentially the same, despite the testing. Check weighings can then be made considerably more frequently than previously, thus further improving the precision of the loader scale. At the same time, possible changes in the timber grade and conditions will be taken into account. In addition, the precision can be improved without addition sensor arrangements. Possible device faults with also be noted more quickly than previously and the check weighing can exploit a wider mass range than previously. In other words, the solution according to the present invention can be easily used to arrange the continuous monitoring of the weighing precision of a weighing system. If necessary, the system can also be programmed to warn the operator of a detected reduction in the assumed precision, of an increase in dispersion, or some other automatically detectable disturbance or other fault in the measurement results.

A functionality, which ensures that the load being used in check weighing at any time will remain unchanged for the entire duration of the check weighing, can be added to the implementation of the check weighing, for instance to the loader scale's software. For example, it is possible to prevent the opening movement of the grapple for the entire duration of the check weighing. Similarly, the use of the hoist's functions can be prevented during the static stage of check weighing. The software is part of the software product according to the invention, which implements the stages of the method according to the invention.

DESCRIPTION OF THE DRAWINGS

In the following, the invention is described in detailed with reference to the accompanying drawings showing some embodiments of the invention, in which.

DETAILED DESCRIPTION

Figure 1A:
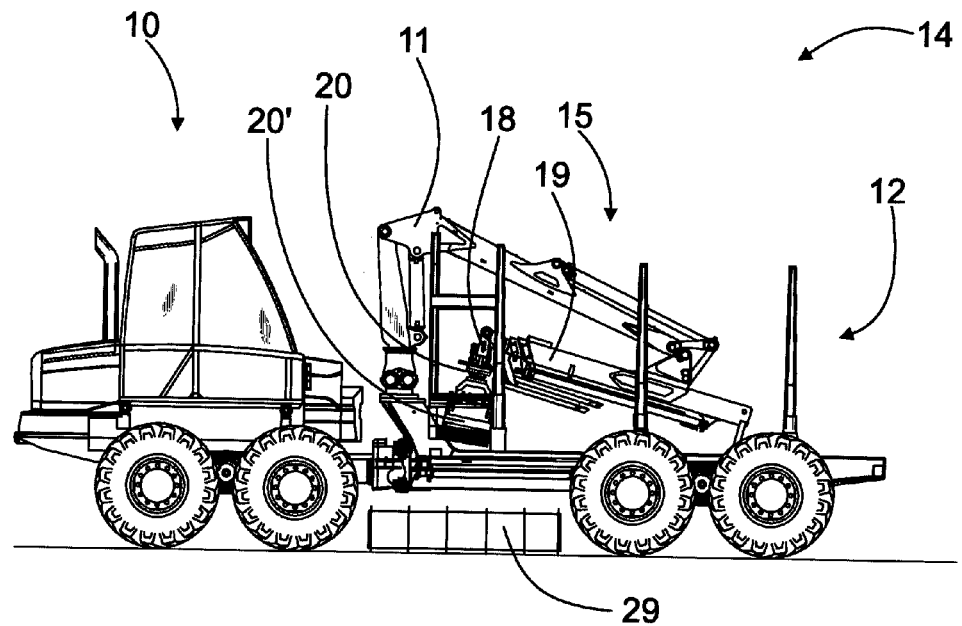
FIG. 1a shows a side view of a forwarder.
Figure 1B:
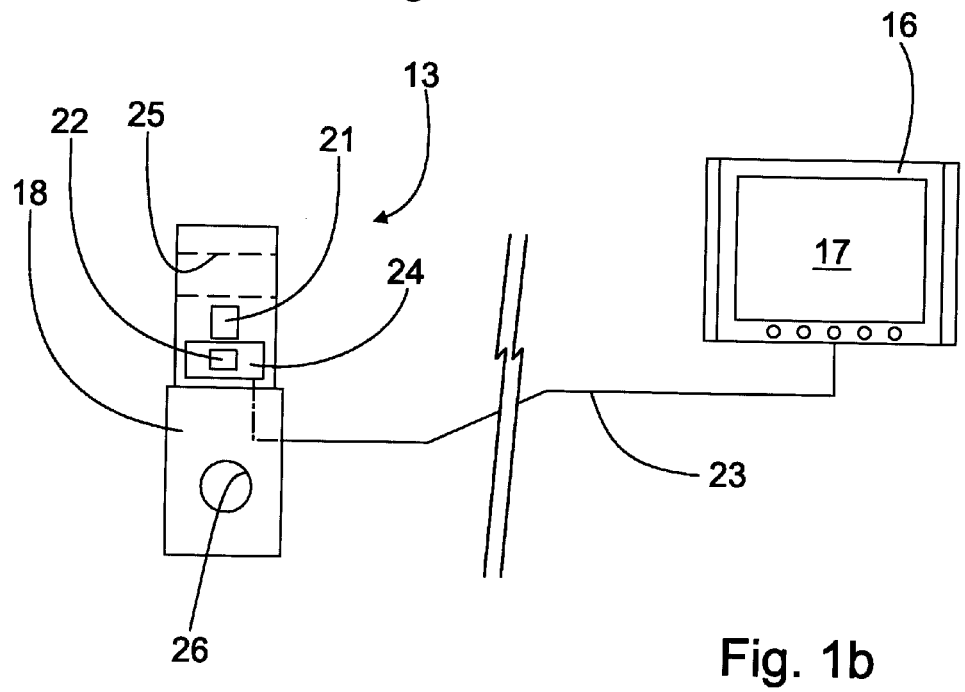
FIG. 1b shows a schematic diagram of an as such conventional loader scale with its central unit, separately from the loader.

FIG. 1 shows an, as such, known forwarder 10, which includes a loader 11 and a load space 12. FIG. 1b shows a schematic diagram of a loader scale 13, together with its accessories. In this case, the forwarder is an example of a materials-handling machine, in which there is an arrangement according to the invention. A weighing system 14, in which the hoist 15 is a loader 11 and the weighing system includes a loader scale 13, is presented as an example application. The central unit 16 belonging to the totality is preferably located, for example, in the cab of the forwarder and incorporates a display device 17 for transmitting and presenting information to the operator of the weighing system (FIG. 1b). Both the display device and the central unit and other necessary data-processing means can, in a manner that is as such known, be in a forestry machine or other vehicle, or in a work machine in general, while other devices arranged to serve the system, or especially for the loader scale can be, for instance, fitted to a forestry machine. The central unit has the requisite storage and processing power, by means of which the measuring data of the loader scale can be processed and presented to the operator. The actual loader scale is formed of a shackle 18, which is attached between the boom 19 and rotator 20 of the loader 11. In the application of FIG. 1a, a grapple 20', which is turned by the rotator 20, is attached to the rotator 20. The loader scale can also be installed in other vehicles or machines, which relate to materials handling and in which reliable weighing is required. The detailed construction and placing of components of the loader scale can vary considerably within the scope of the present invention. For example, the force and possible acceleration sensors contained in the shackle referred to in the detailed description of the application could also be located somewhere else than between the end of the boom and the rotator, however in such a way that the desired force and/or weight data, and, for example, acceleration data, can be measured.

The length of the shackle is typically about 300 mm and the practical weighing range, for example, 70-2000 kg. In the shackle 18, there is a weight sensor 21, by means of which the load being loaded is primarily weighed. Functionally, the matter in this case is of a sensor reacting to force. Because the force is caused by the mass being weighed, the term weight sensor is used. The weight sensor can be based, for example, on a strain-gauge sensor, or alternatively on, for instance, a hydraulic operating device, preferably a combination of a hydraulic cylinder and a pressure sensor/transmitter. The shackle also includes one or more acceleration sensors measuring acceleration relative to one or more axes, such as in this case one dual-axis acceleration sensor 22, which can be used to monitor the movements of the loader. Indeed, simple loader scales are known, which do not have the said acceleration or other feedback, and are intended to operate reliably only in static situations. Acceleration data can also be used to adjust the load scale, as the movement of the load will naturally affect the weighing result. Data obtained from acceleration sensors can be used to correct the mass of a moving load. The entire lift can then be used to weigh the load and thus to obtain better precision. The detection axes of the acceleration sensors are arranged to form a cross with each other, allowing comprehensive information on the movement and attitude of the shackle to be obtained even using only two sensors. It is naturally also possible to use an arrangement measuring acceleration relative to three axes, in which the sensors measuring acceleration parallel to each axis can be separate, or integrated to form a single totality. In the central unit there are also the necessary voltage feeds and data-transfer connections for operating various components. In this case, there is a CAN bus 23 between the shackle 18 and the central unit 16. In a manner that is, as such, known, the data transfer can also be implemented if desired entirely wirelessly. This can be an advantage if the information should be transferred in difficult environmental conditions, such as in connection with the booms of a forestry machine that can easily strike external obstacles.

A weight sensor 21 is built into the shackle 18 and can be used to measure forces in both the longitudinal and transverse directions of the shackle 18. In a static situation, when the forwarder is on a horizontal surface, the longitudinal direction will be essentially in the direction of gravity and an essentially straight pull will be directed on the weight sensor, assuming that the load has been gripped centrally relative to its centre of gravity. When the forwarder is on a sloping surface and/or with an unbalanced load, slanting forces will also be directed to the shackle, which can also be measured using the weight sensor. A dual-axis acceleration sensor 22 is located on the electronics card 24. At the upper end of the shackle 18 there is a hole 25 for a pin, by means of which the shackle 18 is attached to the boom. Correspondingly, at the lower end there is a second hole 26 for a pin, by means of which the shackle 18 is attached to the rotator. The holes are at right angles to each other, so that the grapple can swing in two directions. In other words, the holes are crosswise, in such a way that the upper pin permits movement parallel to the boom and the lower pin permits transverse movement. At the same time, the weight sensor can be used to measure the forces caused by an eccentric load. In this, case, the lower pin is in the aforementioned transverse direction. Above is described one example of an application of a loader scale. However, the method itself is also suitable for other kinds of weighing systems.

Figure 2A:
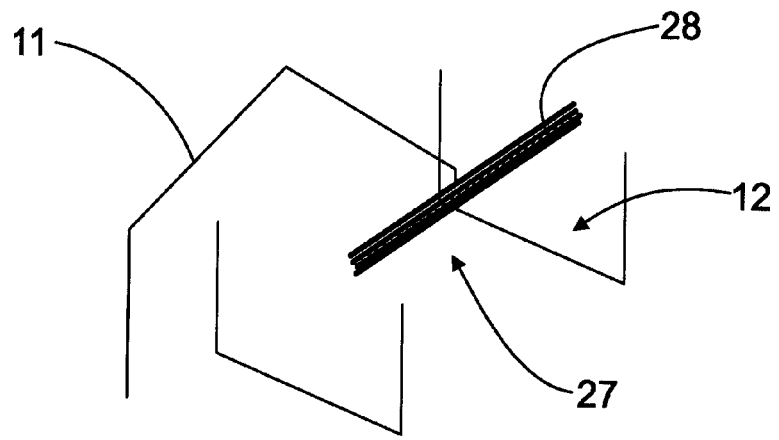
FIG. 2a shows the first stage of the method according to the invention.
Figure 2B:
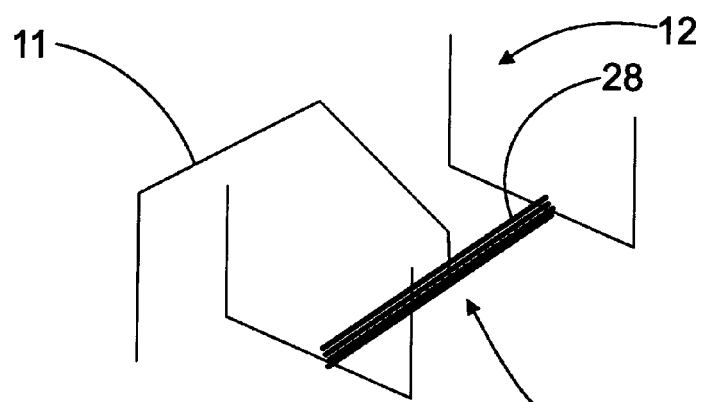
FIG. 2b shows the termination of the first stage of the method according to the invention.
Figure 2C:
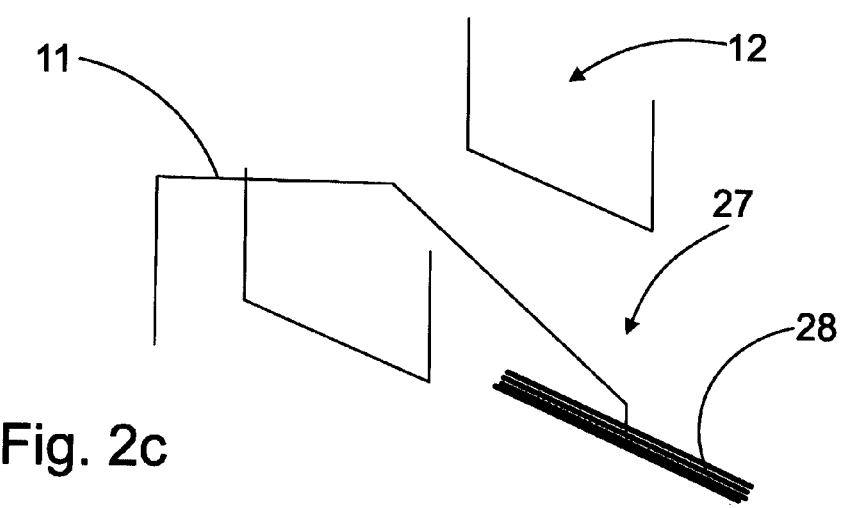
FIG. 2c shows the second stage of the method according to the invention.

FIGS. 2*a-c* show schematically the stages of the method according to the invention. The method is intended for use in the check weighing of a loader scale. Check weighing is required in order to assess and determine the reliability of the loader scale. Check weighing is also required in order to adjust the loader scale, if deviations over set limits appear in the check weighing. In the method, a load 27, which is weighed, is raised by means of a loader 11 equipped with a loader scale 13. In the check weighing, the values measured by the loader scale 13 are recorded and the loader scale 13 is adjusted on the basis of the recorded values. The adjustment is primarily by means of software. In other words, specific setting values are altered with the aid of the user interface of the central unit. According to the invention, a real load 28, which is weighed when not moving, is used as the load 27. First of all, by using a real load it is possible to eliminate the previously used test weight. In addition, the weighing is first of all performed without movement, so that the measurement result for the mass of the load is obtained in a static state. In a static state, the factors disturbing weighing are as insignificant as possible. After this, the same real load 28 is weighed during a normal transfer. In other words, the load is weighed while moving, for example, when moving the load from the load space to a stack. One way to implement the check weighing is described in the example. The method according to the invention also works, for example, in a loading situation. The normal transfer is then from outside the load space, for example, from the surface of the ground to the load space. The inverse operation would be suitable, for example, for the handling of bulk goods, in which the bulk goods are handled only once by the grapple. If necessary, the load is lowered back into the load space/onto the load space, to be carried by it, so that the load scale will be reset and the second lift will correspond as closely as possible to a normal lift. A reference result will then be obtained for the mass of the load in a dynamic state. According to the invention, a reference value of the same real load 28 is determined from these two weighings, on the basis of which the loader scale 13 is adjusted, if necessary, and/or the precision of the loader scale 13 is determined. In other words, if, on the basis of the check weighing, the precision of the loader scale is at an acceptable level, the check weighing stops and work can continue normally. On the other hand, an excessive deviation requires measures to be taken, about which more later. The reference value can be an individual value, or it can consist of several values, or there can be a plurality of values. The solution according to the present invention in any event permits an effective estimate of the precision implemented by the weighing system at any time and, for example, a warning to be transmitted to the operator of the weighing system, such as the driver of a forestry machine, if the precision is detected as deviating from the set objectives. In other words, the operator of the weighing system is given and/or shown an estimate of the weighing accuracy of the weighing system at any time. Generally, the precision value is determined essentially continuously and the precision value at any time and/or its assumed estimate is transmitted to the operator.

The said two weighings of the same real load can also be made in a different order. In other words, the check weighing can also be implemented in such a way that the operator is not informed that the matter is of a check weighing. The load will then be transferred from the load space normally to a stack and, at the same time, the load will be weighed while moving. After the movement, the arrangement requests the load to be stopped momentarily, so that the load is weighed when not moving. The driver cannot influence the weighing, because the arrangement informs them of this only afterwards. If necessary, the load is lowered in order to reset the scale prior to weighing. The manner described above is easily implemented, as the scale is connected to the machine's control system. The software can then be used to prevent the grapple opening, if the question is of a check weighing. After a stationary weighing, the load can be lowered onto a stack and the grapple opened. After this, unloading continues normally.

FIG. 2a shows schematically a check weighing according to the invention. In this case, the real load 28 has been raised to a height of about one meter over the machine's load space 12 and/or the load that is in it and now hangs freely without touching anything. On the basis of the acceleration sensors or the measurement data in general, the weighing system decides that the swinging has stopped, when the static load is weighed. In principle, in the existing manner, there can be a predefined program for check weighing in the central unit. The operator then selects the program in question and acts in the manner described above. However, the real load 28 is preferably selected randomly, or by classifying in the desired manner the loads as belonging to the classes obtained, so that a sufficiently representative sample will be obtained for the check weighing. Classification can preferably take place, for example, with the aid of mass classes for the load and/or by timber grades. For example, the mass classes could be, for instance, 200-400 kg, 400-600 kg, and 600-800 kg, while the timber grades could be, for instance, pine fibre, energy-wood fraction, spruce log, etc. The operator then need not, and cannot be alerted for the check weighing, instead the system itself selects the loads being used as the objects for check weighing, in order to obtain the most useful sample. In other words, the weight and/or timber-grade classes are selected preferably emphasizing check weighing. The operator can then concentrate on his work, leaving the central unit to determine when the check weighing will take place. This will also ensure that check weighing is done sufficiently frequently. On the basis of the measured values, the central unit can also alter the frequency of the check weighings. For example, if the driver and the timber grade remain unchanged for a long time, check weighing may only be needed infrequently. Correspondingly, when the number of variables increases and/or become more frequent, check weighing can be done frequently. In the same way, the frequency can be altered on the basis of the check weighings. If the precision decreases, check weighing will be performed more frequently and vice versa. On the basis of calculations and tests, four to five check weighings a day should be sufficient. It is obvious that, if unnecessary check weighings can be avoided by using the solution according to the invention, considerable advantages can be gained. A random command by the central unit to make a check weighing will reduce the effect of the operator on the result. In other words, prior alerting is eliminated, so that more comprehensive and precise check weighing will be obtained. In addition, the weighing arrangement can sense changes taking place in working procedures, for example, on the basis of the signals given by the acceleration sensor and demand or suggest that a check weighing be made when this need appears. On the other hand, the driver can, if desired, make check weighing supported by the system. Then, for example, five load lifts can be made, when the system will select randomly the said five lifts from the following loads, which are check weighings. In this way, the loader scale can be rapidly made to measure correctly, for example, after maintenance operations, if a fault has made it necessary, for example, to install a new weight sensor.

In FIG. 2b, the real load 28 is lowered back into the load space 12, when the loader scale is reset. During resetting, the grapple is kept closed, so that the load will remain essentially the same. The system can also be programmed to prevent the grapple from opening, thus preventing the load from varying. In the second stage of the check weighing, the load 27 is lifted and moved to stack (FIG. 2c) in accordance with normal working procedure. If the result of check weighing performed in this manner is an acceptable precision, work can continue without interruption.

Above, reference has been made to random check weighing, defined by the central unit. The loads being lifted are then unavoidably of different weights. For example, some of the loads can consist of long fibre timber and some of only treetops. Thus, according to the invention, loads of different weights are weighed in the check weighing. In practice, the loads can be, for example, 100-1000 kg. When unloading of the load space starts, the grapple is easily filled, when a heavy load is formed. Correspondingly, for example, when taking the last fibre tree from the load space, a light load is formed. Thanks to the central unit, the operator however need not think of the coming check weighing, and can thus concentrate on his actual work. The central unit is also programmed in such a way that the timber grade being loaded at each time can be entered in the central unit. Thus, different grade loads can also be weighed in the check weighing, allowing their special characteristics to be taken into account. For example, in first thinning, or when harvesting energy timber, the full-length commercial timber or energy-wood bundles being loaded will be several meters long. In that case, a load formed of commercial timber often tilts, which can cause an error in weighing. On the other hand, stumps, for example, are dense but heavy. In addition to the timber grade and load weight, check weighing and adjustment of the arrangement are driver-specific. In other words, different settings can be set for different drivers, so that the effect of the driver's personal manner of working can be filtered out from interfering. If desired, it is also possible to take into account, for example, the direction of movement of the loader when unloading a load. Thus, it is possible to take into account whether the load is being unloaded to the right-hand or left-hand side of the load space, seen from the direction of the loader's rotating device. The rotating device is conventionally fitted with sensors, in such a way that the angle of rotation of the booms relative to the rotation device's attachment base is known.

Usually, even a single check weighing performed from time to time will give sufficiently good certainty of the reliability of the loader scale and, in addition, this information can be recorded in the log file of the weighing system, or some other suitable location, which will in practice permit the monitoring of the weighing system's precision to be documented. However, the reference value is preferably determined from several consecutive check weighings of different loads and a precision value, on the basis of which the loader scale is adjusted, is calculated from the determined reference values. The central unit can also collect the values of several check weighings and form a result from these, on the basis of which the loader scale can be adjusted, if necessary. The effects of the operator and the goods grade on the operation of the loader scale can then be taken into account, in which case the value of the loader scale can be made to correspond better than before to the real mass. If the error is systematic, i.e. it repeats irrespective of the operator and the timber grade, a corresponding correction can be made in the central unit. In that case, the operator alters the setting values from the central unit. In addition, the central unit can be programmed to use the historical data on the normal weighings and check weighings, to adjust the operation of the loader scale. In other words, on the basis of the measurements performed, the central unit can estimate specific setting and correction values, in which case the loader scale is adjusted independently. In other words, on the basis of the precision value of the check weighings, for example, the loader scale is adjusted by means of software on the basis of the check-weighing results.

Even though the check weighing takes place with sufficient precision in the manner described above, the reliability of the loader scale can be further improved by using an as such known test weight as the load. A test weight 29 is shown in FIG. 1a and can be, for example, a three-meter long steel pipe, which is cast full of concrete or some other material, in order to create the desired mass. As such, the size or mass of the test weight is of little significance, as long as the mass is known precisely and can be assumed to be distributed evenly inside the test weight. In that case, the test weighing is performed only statically, so that the loader scale is brought theoretically into the correct measurement range and errors caused by, for example, device faults can be detected. A greater precision than that demanded of the weighing system is preferably used and a check weighing is also performed when the test weight is tilted. Tilting is achieved by gripping the test weight eccentrically, in such a way that the test weight settles into a tilted attitude, with one end being lower than the other. In other words, the upper and lower pins of the shackle permit the load to tilt into an attitude corresponding to a state of equilibrium. In static check weighing, an accuracy of, for example, ±2% is demanded. The values of the check weighing, which is performed from time to time, for example, once a week, are recorded and exploited in the check weighing according to the invention.

Because the matter is of a check weighing, it will be sufficient to ascertain that the precision of the loader scale is within the permitted limits. However, in each check weighing, the reference value or precision value created from reference values is compared to the set limit values and, if the limit value is exceeded, an error report is created. The error repot can be, for example, simply a notification to the operator, who carries out the agreed operations. According to the above, especially in systematic errors, the central unit can adjust the setting values by means of software. However, one or more check weighing are preferably performed on the basis of the error report, so that random errors in the check weighing or in the actions of the operator can be eliminated. If, after repeated check weighings, an acceptable precision is reached, work can continue normally. If, however, at least three check weighings cause an error report, the loader scale is adjusted manually. If necessary, a test weight is used, so that sensor faults, for example, can be eliminated.

Figure 3:
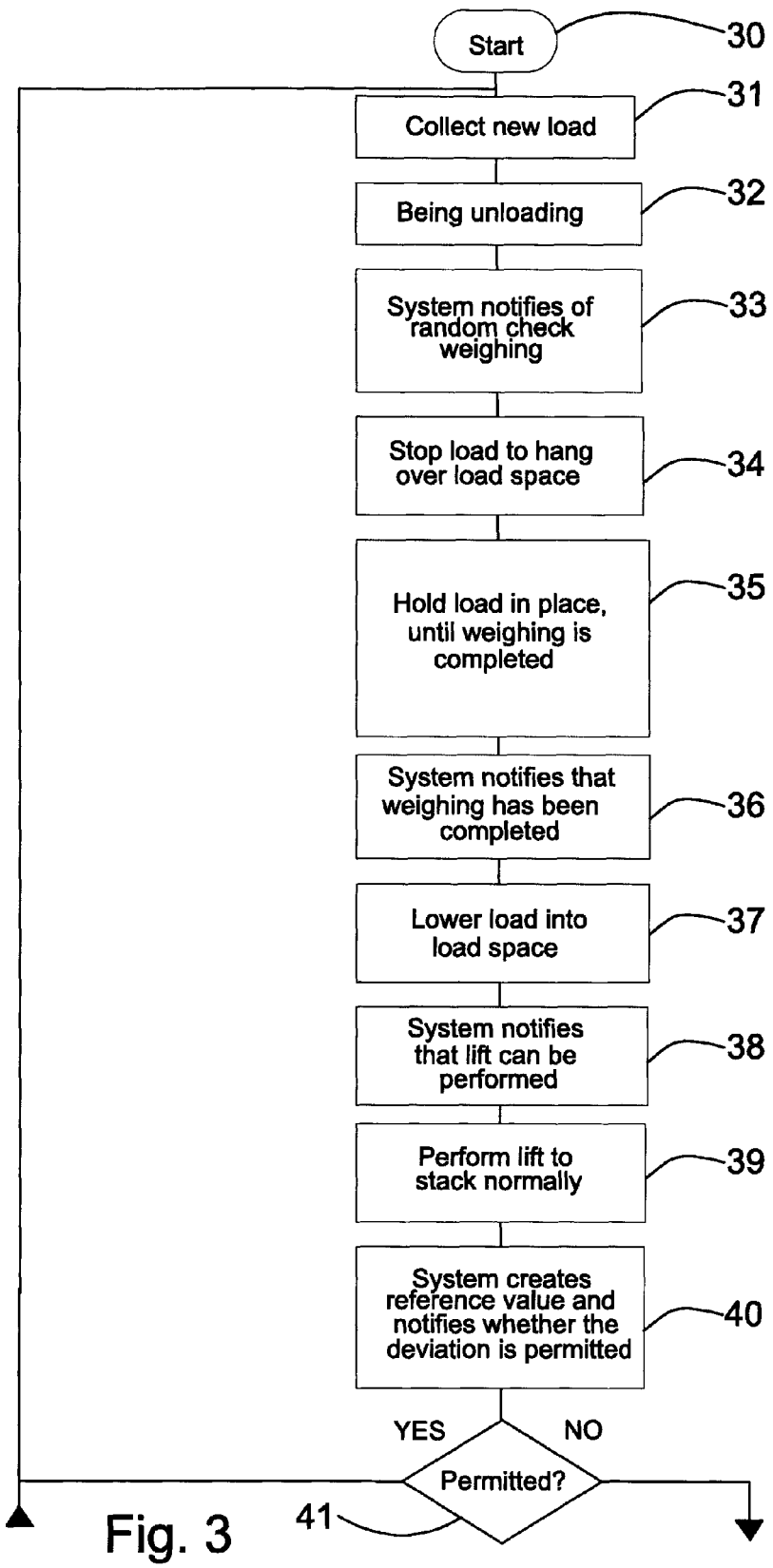
FIG. 3 shows the stages of the method according to the invention, in a normal situation in check weighing.

FIG. 3 shows the stages of a check weighing according to the invention. The central unit's program proposes, for example, from four to five times in a working day, that the question is of a check lift. The suggestion, or rather notification appears on the display device, when a load is started to be lifted from the load space to the stack. An audiovisual indication of the notification can also be given, for example an audible signal and/or an indicator light, or more preferably a message given on the screen of the display device and sound signal. According to the instruction given, the operator lifts the load off the load space and leaves the load to hang freely. Once the load has stopped swinging, the loader scale weighs the static load. That the load has stopped can be ascertained also from the measurement data of the weight and/or acceleration sensors. If the measurement data and the values determined from them are within the set limits, the weighed mass can be recorded. After the instruction comes to the display device, the operator lowers the load back onto the load space, when the loader scale resets. Finally, the operator makes a normal lift from the load space to the stack and, at the same time, monitors the lifting speed and/or the time taken by the lift, which can be utilized in the weighing system.

Reference information is recorded in the central unit from each check weighing, so that during one week, for example, 20-check weighings are easily accumulated, which corresponds to the known check weighing based on a test weight. Because the decision concerning a check weighing is made when the lift is started, the program can selected the loads in such a way that the check weighing will be made using loads of different weights, for example, in the range 100-1000 kg, and in addition with different timber grades. Comprehensive measurement information will then be obtained, on the basis of which the loader scale can be fine-tuned in such a way that it will measure different kinds of load as correctly as possible. From the loader-scale monitoring obtained from the check reports obtained from the central unit easily understandable and reliable information is available for a person selling standing timber, for contractors, and for timber buyers, as well as for machine entrepreneurs, machine contractors, and for the driver too. At the same time, the number of times test weights are used can be clearly reduced and even during a check weighing timber is moved from the load space to the stack. The saving in time compared to present check weighing can easily be more than two hours each week, if previously the test weight was used once a day and about half an hour was taken up with the check weighing. At the same time, the precision of the loader scale is improved substantially.

Figure 4:
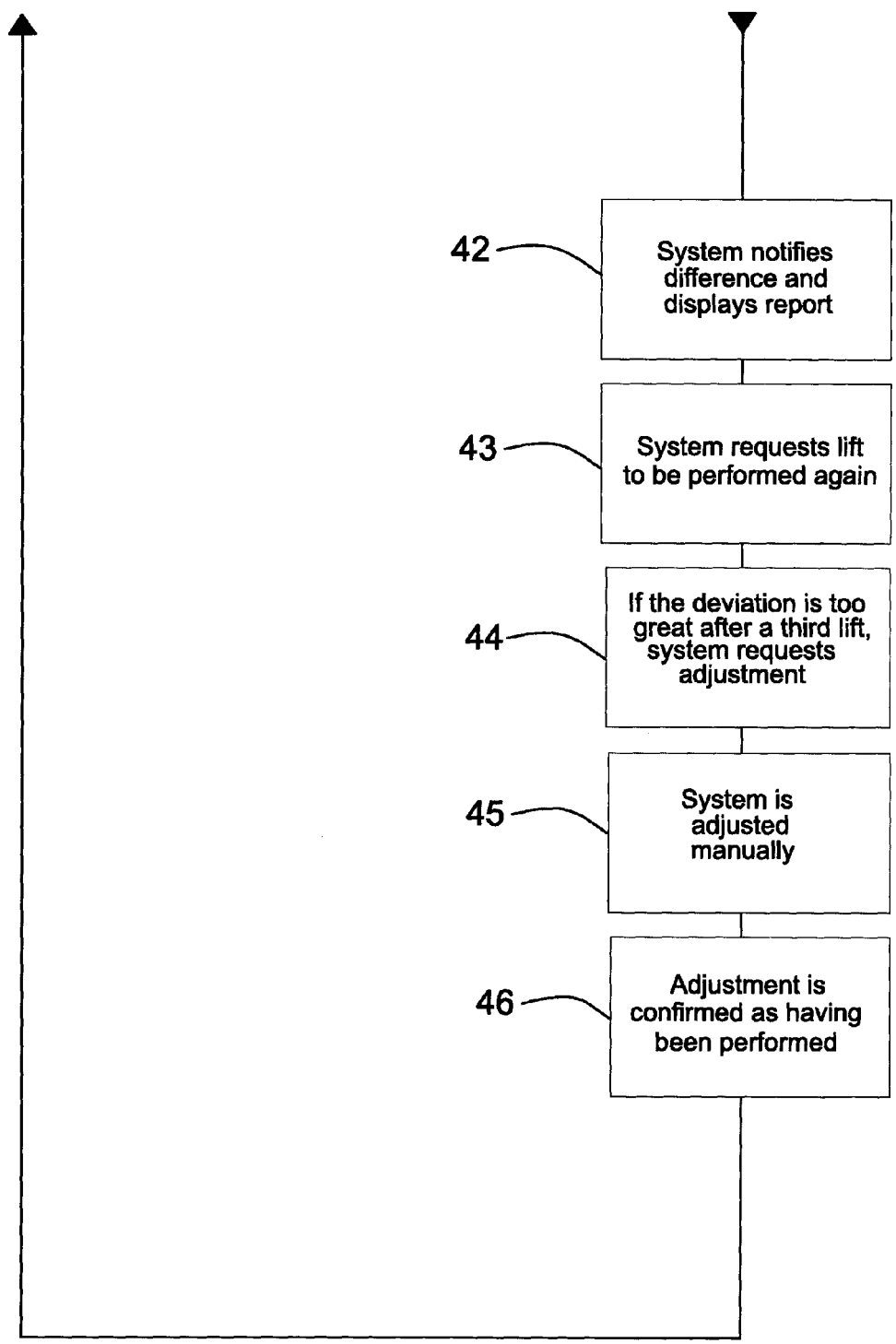
FIG. 4 shows the stages of the method according to the invention, in an error stage in check weighing.

In the following, the stages of the method according to the invention are described in principle, with reference to FIGS. 3 and 4. The flow diagram of FIG. 3 continues on page 4, according to the arrows. Stage 30 is the start, which generally corresponds to the switching on of the central unit. On the other hand, the check weighing can also be started manually. In this case, the system assumes that check weighing will be carried out with the next load. Thus the following stage 31 is the bringing of a new load. By default, the system operates in the background, so that the operator cannot prepare for the coming check weighing, unless he himself has started the check. In the following stage 32, the unloading of the load onto the stack is started. On the basis of a random sample, the system notifies the operator that this is a check weighing (stage 33). The notification comes only once the lift has commenced, and not before it. Thus, the operator cannot prepare for the check weighing. The operator stops the load to leave it to hang freely (stage 34). Once the load has stopped, the system records the mass of the load (stage 35). After recording, the system notifies the operator of the matter (stage 36), when the operator, guided by the system, lowers the load back into the load space (stage 37). The stopping of the load can, as described above, be detected automatically, by exploiting the information available from the weight and/or acceleration sensors. On the other hand, the interpretation of the load as having been stopped can also, if desired, be left to be done by—and to be the responsibility of—the operator of the weighing system. The operator receives a notification that resetting has been performed and normal lift is possible (stage 38). Once again, the system guides the operator to perform a normal lift to a stack (stage 39) and during the lift the load is weighed dynamically. According to the invention, the system calculates a reference value from the two measurements and notifies whether the precision was within the permitted limits (stage 40). In the selection stage 41, a YES response terminates the check weighing, as a result of which a report is created. The report remains in the system as historical data and can be transferred to other systems, for example, in order to attest to the check weighing, or for other purposes. After the reporting, the system returns to the normal operating state, in which each load is weighed dynamically in order to determine the total mass of the load. However, the check weighing is all the time in the background in the system, and starts randomly or at the initiation of the operator. The randomness can also be directed and/or emphasized as described above to desired load categories, for example, on the basis of the load's weight and/or grade of goods. The system can also monitor the precision and, if necessary, start check weighing at any time when it is felt to be advantageous, for example, in terms of absolute weighing precision and/or dispersion.

In selection stage 41, a NO response is also possible, in which case the system notifies of the deviation and the operator is shown a report (stage 42). In this case, the operator, guided by the system, makes a new lift (stage 43). For example, if the deviation is still great after three lifts, the operator changes to manual adjustment (stage 44). In this exemplary embodiment, the weight display of the system is adjusted, by altering which the system is calibrated (stage 45). After adjustment, the adjustment is acknowledged in the system (stage 46), which returns to the normal operating state. If desired or when suggested by the system, the operator can next make a check weighing, according to stages 31-41.

Figure 5:
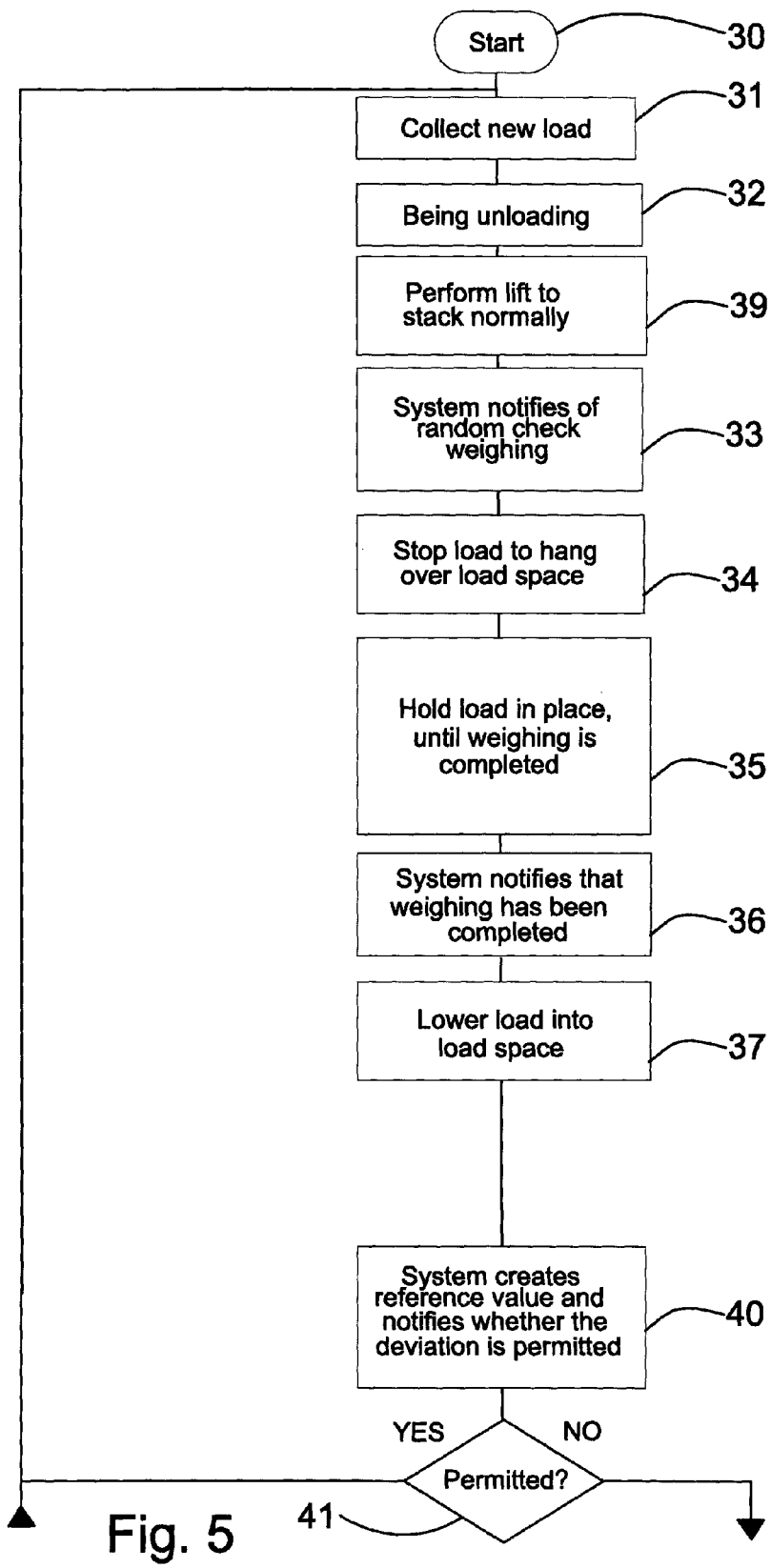
FIG. 5 shows the stages of the method according to the invention, in an alternative check weighing.

FIG. 5 shows an alternative way to perform a check weighing. In this case, the load is moved normally to the stack, so that the system weighs the load when moving (stage 39). Guided by the system, the operator stops the load to hang over the stack, without opening the grapple (stage 34). Now, the same load is weighed when not moving. After the check weighing, the grapple is opened and the unloading of the load can continue normally.

The following is one example of the determining of the precision value. In this case, the weighing system records five consecutive check weighings. In addition, the system calculates first the difference between the static lift and the dynamic lift from each check weighing. Next, the weighing system calculates the percentage difference of the static lift. The percentage share in question is the precision value, which can be notified to the operator. The weighing system monitors the check lifts and on their basis the future precision can be estimated, or the mean precision of the five previous check weighings, for example, can be notified. For example, the static weighings of the load were 821, 727, 969, 822, and 704 kg. Correspondingly, the dynamic weighings were 867, 738, 961, 901, and 724 kg. From these, a mean precision value can be calculated, i.e. in this case a percentage difference of +1.16%, which is within the permitted limits. Different variables can be added to the determining of the precision value, but the basic values are two consecutive weighings of the same load.

The weighing system can generate and transmit automatically a value and/or symbol or other signal depicting the precision of the weighing system, with the aid of which the driver can easily and essentially continuously monitor the estimated precision, while working. In practice, the operator will be given, for example, a graphical symbol or simple numerical value, from the display device.

The system is able to take into account several different variables simultaneously, as described above. In addition to variations in timber grades and operators, changes in working conditions and procedures and their effects can be taken into account in check weighing. For example, the asymmetricality of the forwarder or loader can be taken into account, in which case the same precision will be obtained when unloading or loading the load tractor to and from both the right and left sides. The possible asymmetricalities and non-idealnesses can then be programmed into the system. Possible differences can be discovered by making check weighings in both directions, i.e. to the right and to the left, from the load being unloaded. If necessary, a lift can be made to the left, even though the stack might be on the right, and vice versa. The necessary adjustments are made by the operator and/or the system. Technically, the weighing system is able to determine the unloading direction without any action by the operator, as, when the loader scale, for example when installing the loader or hoist, in the loader, sensor means monitoring the angle of rotation are installed, for example, in its rotation device. Thus, the sensor arrangements of the loader scale notifies the weighing system of the rotation angle at any time. On the other hand, the movements of the loader can also be monitored with sufficient accuracy for the purpose also without separate sensor arrangements, if the operations of the loader, especially the control of its rotation device, are monitored while working.

The invention claimed is:

1. A method in the check weighing of a weighing system, comprising:
    lifting a real load of material with a hoist equipped with a weighing system;
    weighing the real load of material during a normal working procedure, the weighing comprising weighing the real load of material when the load is stopped and weighing the real load of material when the real load of material is moved with a hoist;
    recording a value measured by the weighing system;
    determining a reference value from these two weighings of the same real load, on the basis of which the weighing system is adjusted if necessary and/or the assumed precision achieved by the weighing system is estimated; and
    adjusting the weighing system as required, on the basis of the reference value.

2. A method according to claim 1, wherein the real load is selected randomly.

3. A method according to claim 1, wherein reference values are determined from several consecutive check weighings of different loads and a precision value is calculated from the determined reference values, on the basis of which the weighing system is adjusted, if necessary, and/or the precision of the weighing system is ascertained.

4. A method according to claim 3, wherein the precision value is determined continuously and the precision value at any time and/or its assumed estimate is transmitted as such numerically or in some other manner to an operator.

5. A method according to claim 3, wherein the weighing system is adjusted by means of software on the basis of the precision value and/or its estimate.

6. A method according to claim 1, wherein loads of different weights are weighed in the check weighing.

7. A method according to claim 1, wherein loads representing different grades of goods are weighed in the check weighing.

8. A method according to claim 6, wherein different types of loads are classified and weight and/or goods-grade classes formed are selected for emphasis in check weighing.

9. A method according to claim 1, wherein in addition to the real load, a test weight is used as the load at least from time to time, wherein the mass of the test weight is known precisely and by means of which the check weighing is made only statically.

10. A method according to claim 1, wherein the reference value is compared with a set limit value and, if the limit value is exceeded, an error report is created.

11. A method according to claim 10, wherein on the basis of the error report, one or several check weighings using the real load are performed.

12. A method according to claim 11, wherein if at least three check weighings cause an error report, the weighing system is adjusted manually.

13. A method according to claim 1, wherein the real load is weighed first when stopped and then when moving.

14. A method according to claim 1 wherein the real load is weighed first when moving and then when stopped.

15. A non-transitory computer readable medium encoded with software code elements, which are arranged to perform the stages of the method according to claim 1.

16. An arrangement in the check weighing of a weighing system, comprising: a hoist belonging to the arrangement being equipped with a weighing system for weighing a load to be lifted by the hoist, the weighing system including a central unit for recording a value measured by the weighing system and, if necessary, for adjusting the weighing system on the basis of the recorded value, wherein a lifted real load of material is arranged to be used as the load in order to weigh the same lifted real load of material both when stopped and when moving during the same normal working movement, and wherein the central unit is arranged to determine a reference value from these two weighings of the same real load, in order to adjust the weighing system if necessary, and/or to estimate the assumed precision achieved by the weighing system.

17. An arrangement according to claim 16, wherein the central unit includes a non-transitory computer readable medium encoded with software code elements, which are arranged to perform the stages of a method comprising lifting a real load of material with a hoist equipped with a weighing system;

weighing the real load of material during a normal working procedure, the weighing comprising weighing the real load of material when the load is stopped and weighing the real load of material when the real load of material is moved with a hoist;

recording a value measured by the weighing system;

determining a reference value from these two weighings of the same real load, on the basis of which the weighing system is adjusted if necessary and/or the assumed precision achieved by the weighing system is estimated; and adjusting the weighing system as required, on the basis of the reference value.

18. An arrangement according to claim 16, wherein the arrangement is included in materials handling equipment.

* * * * *